(No Model.)
R. T. SMITH.
COTTON CARRIER.
No. 404,991. Patented June 11, 1889.
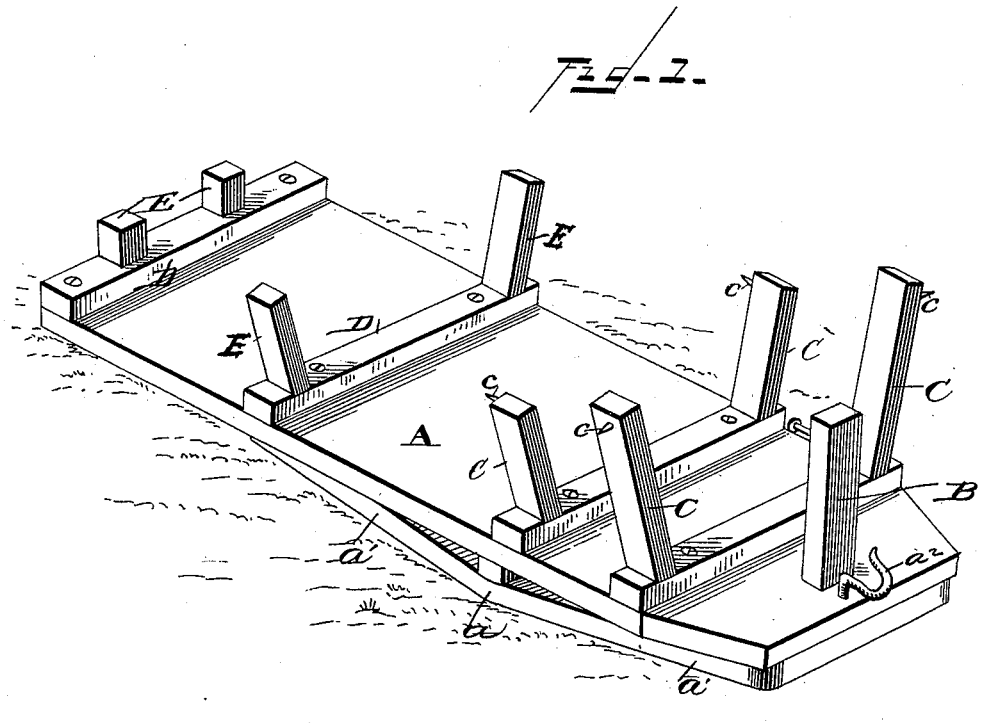
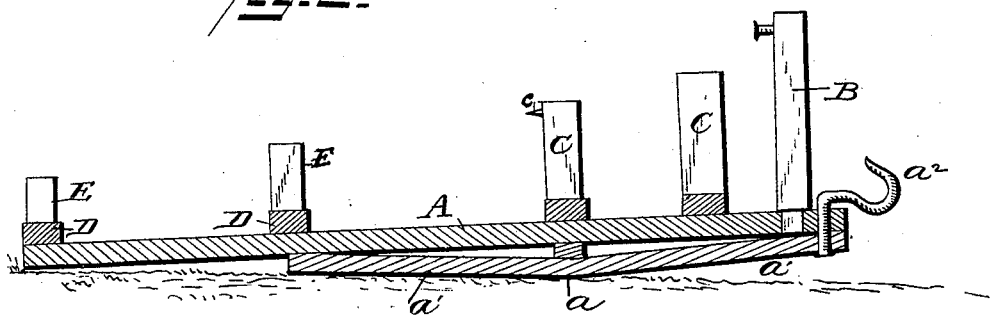
WITNESSES
INVENTOR
Attorneys

UNITED STATES PATENT OFFICE.

ROBERT TOUMBLESON SMITH, OF KAUFMAN, TEXAS.

COTTON-CARRIER.

SPECIFICATION forming part of Letters Patent No. 404,991, dated June 11, 1889.

Application filed January 22, 1889. Serial No. 297,164. (No model.)

*To all whom it may concern:*

Be it known that I, ROBERT TOUMBLESON SMITH, a citizen of the United States, residing at Kaufman, in the county of Kaufman and State of Texas, have invented certain new and useful Improvements in Cotton-Carriers; and I do hereby declare the following to be a full, clear, and exact description of the invention, such as will enable others skilled in the art to which it appertains to make and use the same.

My invention relates to a cotton-carrier; and the object of my improvement is to provide a device that will assist a cotton-picker, by means of carrying the cotton and providing a way to effectually hold open the bag in which the cotton is put while picking. I attain this object by a certain construction and arrangement of parts, which will be fully described in this specification, and illustrated in the accompanying drawings, in which—

Figure 1 is a perspective view of the cotton-carrier. Fig. 2 is a sectional view showing the construction of the bottom of same.

A designates the bottom of the carrier, which is made of sufficient width to go between the rows of cotton, which usually are about sixteen inches wide. The portion of said bottom that slides upon the ground is constructed, as shown in Fig. 2, with the ridged portion $a$ and the inclined portions $a'$ $a'$. The purpose of said inclined portions in front is to prevent the earth from catching or pulling up before the carrier, and behind or in the rear to provide a surface whereon the carrier slides while being drawn. To the bottom A in front is attached the hook $a^2$, to which the horse is hitched. The upright post B in front is for the purpose of holding the lines. The posts C are four or more in number, and each provided with a hook or nail $c$, to which the mouth of the bag is attached simply by fastening or hooking the mouth of the bag upon the same. By this means the bag is held open, enabling the cotton-picker to readily place the cotton in the bag.

The cross-sectional portions D and the upright posts E upon the rear of the carrier are to hold the bags when filled with the cotton and tied—that is, said bags are laid against the posts as they accumulate. This prevents them from falling forward in the way of the picker, or off the rear onto the ground. It will be observed that the carrier can be made to hold as many pounds as the horse can draw. The carrier shown in Fig. 1 is intended to carry a picker at each post C. This enables them to pick from the row of cotton upon each side of the carrier.

The ordinary way of picking cotton is to carry the bag upon the shoulder of the picker. This is not only tedious, but extremely tiresome, as the picker has to stop, unload, and weigh whenever he gets thirty or forty pounds. My invention obviates all these difficulties, and enables any one to pick the cotton much easier, as well as much more quickly, and when picked it is upon the carrier, and saves the trouble of gathering it together.

In fact, a picker can pick sixty or seventy pounds more per day upon my carrier than he could otherwise, and when night comes not be half so tired.

As my invention is very useful and practical, it is useless to further enlarge upon its merits.

What I claim is—

In a cotton-carrier, the bottom A, having the ridged portion $a$ and the oppositely-inclined portions $a'$ $a'$, said bottom being provided with a hook in front, the upright post in front for holding the lines, the posts C upon the sides near the front, to which the mouth of the bag is secured to be held open, and the upright posts on the sides in the rear of the posts C, for holding the bags when filled, substantially as described and set forth.

In testimony whereof I affix my signature in presence of two witnesses.

ROBERT TOUMBLESON SMITH.

Witnesses:
R. H. SHAW,
J. C. WARNER.